(12) United States Patent
Kakizaki et al.

(10) Patent No.: US 8,939,822 B2
(45) Date of Patent: Jan. 27, 2015

(54) INDEPENDENT DEFROSTER OUTLET TEMPERATURE AND AIR FLOW CONTROL SYSTEM

(75) Inventors: Shinji Kakizaki, Dublin, OH (US); Junichi Kanemaru, Upper Arlington, OH (US)

(73) Assignee: Honda Motor Co., Ltd., Tokyo (JP)

( * ) Notice: Subject to any disclaimer, the term of this patent is extended or adjusted under 35 U.S.C. 154(b) by 1579 days.

(21) Appl. No.: 12/372,090

(22) Filed: Feb. 17, 2009

(65) Prior Publication Data
US 2010/0210202 A1 Aug. 19, 2010

(51) Int. Cl.
*B60H 1/22* (2006.01)
*B60H 1/00* (2006.01)

(52) U.S. Cl.
CPC ........ B60H 1/00842 (2013.01); B60H 1/00064 (2013.01); *B60H 2001/00092* (2013.01); *B60H 2001/00107* (2013.01)
USPC ........................................................ 454/121

(58) Field of Classification Search
CPC .................................................. B60H 1/00064
USPC ........................................................ 454/121
See application file for complete search history.

(56) References Cited

U.S. PATENT DOCUMENTS

| | | | | |
|---|---|---|---|---|
| 4,440,212 A | * | 4/1984 | Tanino et al. | 165/204 |
| 5,263,893 A | * | 11/1993 | Hoffman et al. | 454/69 |
| 5,447,469 A | * | 9/1995 | Dausch et al. | 454/139 |
| 6,352,102 B1 | * | 3/2002 | Takechi et al. | 165/42 |
| 6,382,305 B1 | * | 5/2002 | Sano | 165/43 |
| 6,598,670 B1 | | 7/2003 | Hashimoto et al. | |
| 7,073,338 B2 | * | 7/2006 | Harwood et al. | 62/3.61 |
| 2002/0157811 A1 | * | 10/2002 | Vincent | 165/59 |
| 2005/0098311 A1 | | 5/2005 | Okumura et al. | |
| 2007/0095517 A1 | | 5/2007 | Schall | |
| 2007/0204985 A1 | * | 9/2007 | Fukagawa et al. | 165/203 |
| 2007/0259614 A1 | * | 11/2007 | Barnhart et al. | 454/121 |
| 2008/0142207 A1 | * | 6/2008 | Friedl et al. | 165/202 |
| 2011/0105007 A1 | * | 5/2011 | Jia et al. | 454/121 |
| 2011/0117829 A1 | * | 5/2011 | Ikeda et al. | 454/155 |

FOREIGN PATENT DOCUMENTS

| | | |
|---|---|---|
| DE | 4022932 | 1/1991 |
| DE | 10127339 | 12/2002 |

(Continued)

OTHER PUBLICATIONS

European Search Report of EP09179675 dated Sep. 17, 2010.

(Continued)

*Primary Examiner* — Steven B Mcallister
*Assistant Examiner* — Frances H Kamps
(74) *Attorney, Agent, or Firm* — Rankin, Hill & Clark LLP

(57) ABSTRACT

An HVAC system is provided and includes an evaporator for providing cold air and a heater core for providing hot air. A heater airflow path directs an airflow through a heater air outlet where a heater damper door controls the volume of the airflow through the heater air outlet. A defroster airflow path directs an airflow through a defroster air outlet and a defroster damper door controls the volume of the airflow through the defroster air outlet. The defroster damper door operates independently from the heater damper door. A separation channel is located between the heater airflow path and the defroster airflow path to separate the airflow of the heater airflow path from the airflow of the defroster airflow path.

8 Claims, 4 Drawing Sheets

(56) References Cited

FOREIGN PATENT DOCUMENTS

| | | |
|---|---|---|
| JP | 11048751 | 2/1999 |
| JP | 2003523874 | 8/2003 |

OTHER PUBLICATIONS

Office Action of JP Serial No. 2010-030911 dated Nov. 5, 2013, 7 pages (w/ English translation).

* cited by examiner

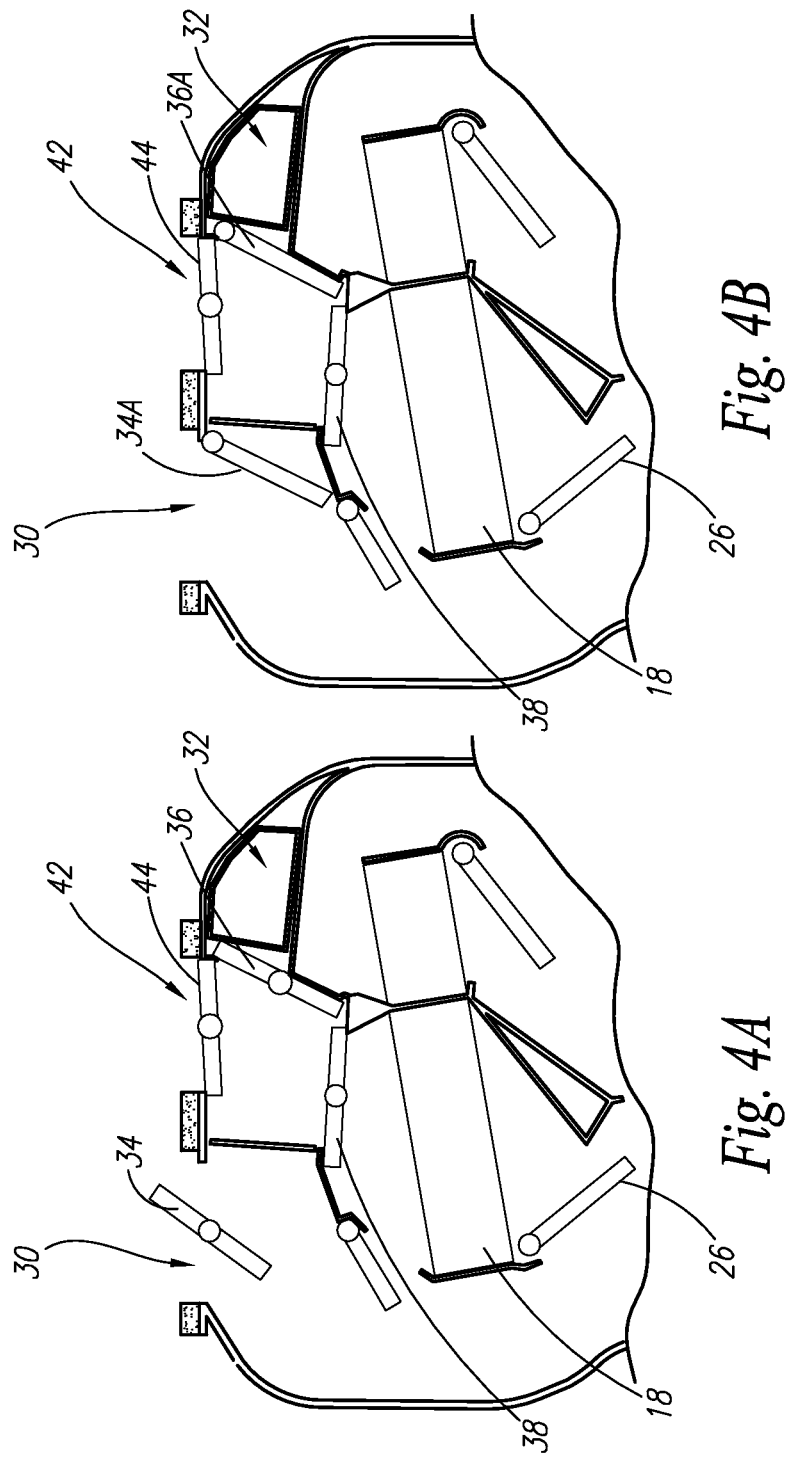

INDEPENDENT DEFROSTER OUTLET TEMPERATURE AND AIR FLOW CONTROL SYSTEM

BACKGROUND OF THE INVENTION

1. Field of the Invention

The present invention relates to an HVAC system for an automotive vehicle and more specifically to an HVAC system having an independent defroster control system.

2. Description of Related Art

To prevent fogging to an interior of a vehicle windshield, the temperature of the vehicle windshield needs to be above the dew point. Hot or warm (heating) air must be directed to the windshield in order to keep the temperature of the windshield above the dew point. In a conventional HVAC system the heating air is directed through an HVAC housing to one of several air outlets. Specifically, the heating air must be directed to a defroster outlet to heat the interior of the vehicle windshield to either defrost the windshield or remove fog from the windshield. A disadvantage, however, to the current HVAC system is that the temperature of the air and the volume of the air exiting the defroster outlet cannot be controlled independently of the temperature of the air and the volume of the air exiting other air outlets in the system.

For example, FIG. 1 shows a schematic view of a conventional HVAC system 100 for an automotive vehicle. The HVAC system 100 includes an HVAC housing 102, a blower (not shown), an evaporator 104, a heater core 106, an air mixing door 108, a mixing chamber 110, an airflow path 112, a defroster door 114, a defroster air outlet 116, a vent door 118, a vent air outlet 120, a heater air outlet 122, and an air outlet mode actuator 124.

The HVAC system shown in FIG. 1 has several modes of operation including defroster mode, heater (or foot) mode, and heater/defroster mode. After air from the evaporator 104 and the heater core 106 is mixed in the mixing chamber 110, the air flows through the airflow path 112 and exits through one or more selected air outlets depending on the selected mode of operation. For example, if heater mode is selected then the airflow is distributed to the heat air outlet 122 and the defroster air outlet 116 with a ratio of approximately 80:20. Further, if the heater/defroster mode is selected then the airflow is distributed to the heat air outlet 122 and the defroster air outlet 116 with a ratio of approximately 50:50. Once a mode is selected, however, the ratio of the airflow is fixed and cannot be adjusted. In other words, the volume of airflow exiting the defroster air outlet 116 cannot be adjusted independently of the air exiting heat air outlet 122.

In addition, the temperature of the air exiting the defroster air outlet 116 is the same as the temperature of the air exiting the heat air outlet 122. Thus, the temperature of the air exiting the defroster air outlet 116 cannot be adjusted independently of the air exiting the heat air outlet 122.

Therefore, what is required is an HVAC system that addresses the above mentioned disadvantages.

SUMMARY OF THE INVENTION

In accordance with one aspect, the present invention overcomes the above mentioned disadvantages by providing an HVAC system for an automotive vehicle that includes an evaporator for providing cold air and a heater core for providing hot air. A heater airflow path directs an airflow through a heater air outlet where a heater damper door controls the volume of the airflow through the heater air outlet. A defroster airflow path directs an airflow through a defroster air outlet and a defroster damper door controls the volume of the airflow through the defroster air outlet. A separation channel is located between the heater airflow path and the defroster airflow path to separate the airflow of the heater airflow path from the airflow of the defroster airflow path. The defroster damper door operates independently from the heater damper door to thereby allow the adjustment of the volume of airflow through the defroster air outlet without disrupting the volume of airflow through the heater air outlet.

In accordance with another aspect, the present invention provides a bypass door located near an entrance of the defroster airflow path. The bypass door controls an amount of hot air that flows from the heater core into the defroster airflow path thereby controlling a temperature of the airflow through the defroster air outlet without disrupting a temperature of the airflow in the heater airflow path.

Additional benefits and advantages of the present invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings that form a part of the specification.

FIGS. 4A and 4B are schematic views of the HVAC system showing different door options.

DETAILED DESCRIPTION OF THE INVENTION

Figure 1:
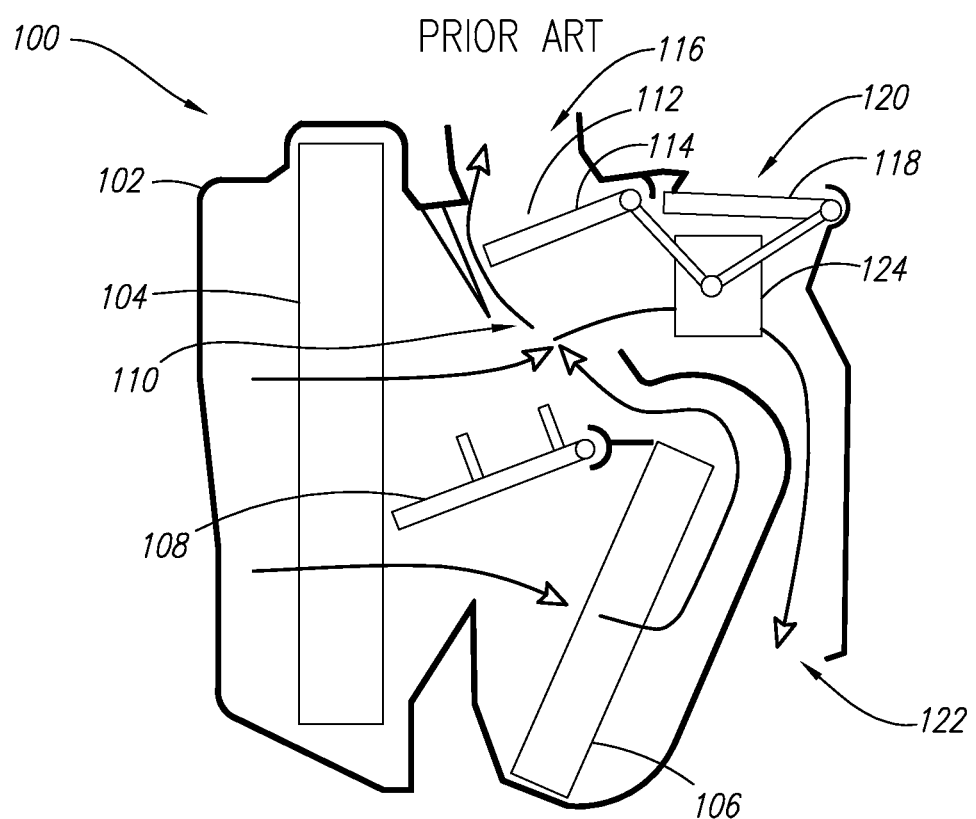
FIG. 1 is a schematic view of a conventional HVAC system.
Figure 2:
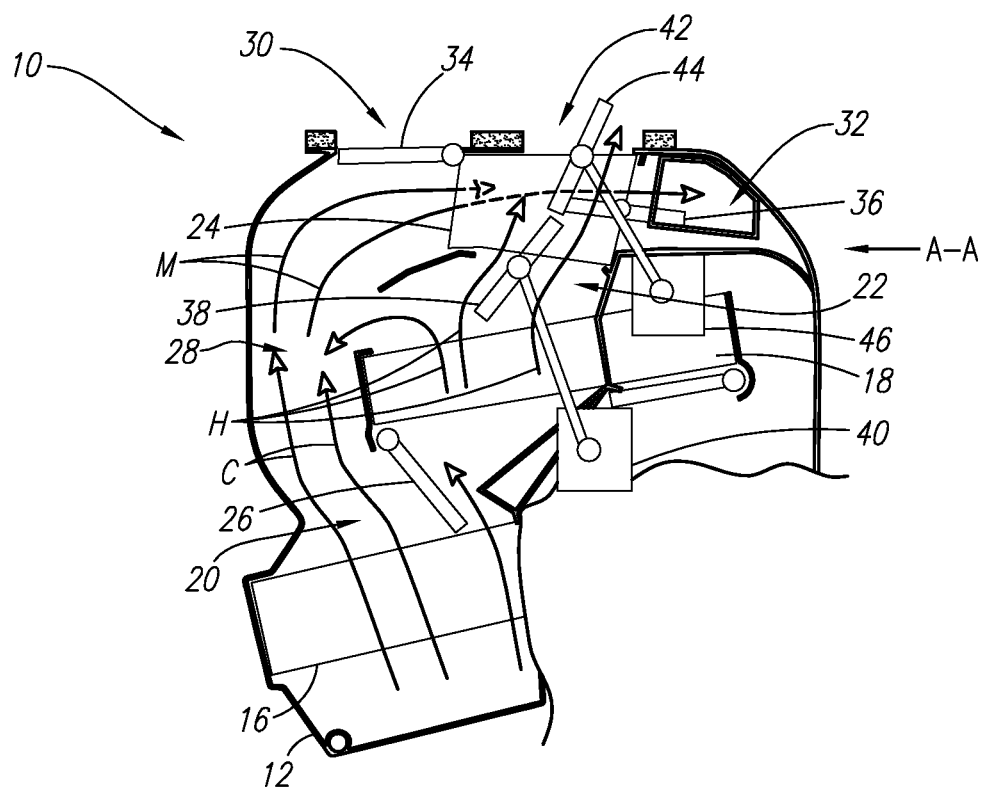
FIG. 2 is a schematic view of an HVAC system incorporating the present invention.
Figure 3:
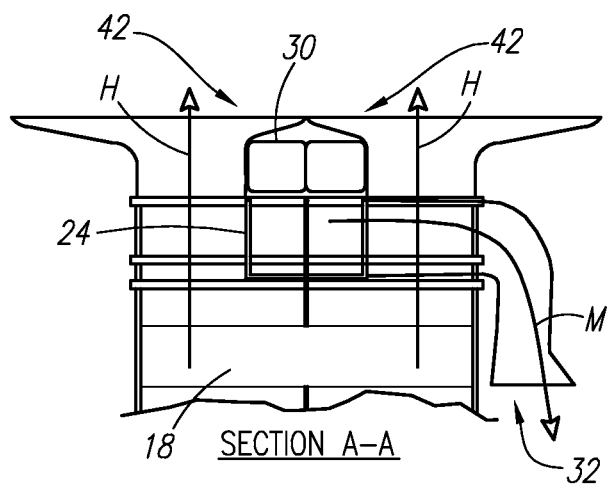
FIG. 3 is a section view of FIG. 2.

Referring now to the drawings, FIGS. 2 and 3 show a schematic view of an improved HVAC system 10 for an automotive vehicle in accordance with the present invention. The HVAC system 10 of the present invention includes a housing 12, a blower (not shown), an evaporator 16, and a heater core 18 located downstream of the evaporator 16. These components are typical components for an HVAC system and operate similar to the components in the conventional HVAC system described above. Thus, the operation of these components will not be explained in further detail. Further, cold air flowing from the evaporator 16 is represented by arrows designated with the letter C. Hot air flowing from the heater core 18 is represented by arrows designated with the letter H. The mixture of hot and cold air is represented by arrows designated with the letter M. Further, any reference to "volume of air" or "airflow" in the specification does not specifically refer to cold air, hot air or mixed air but rather is just a generic term used for simplicity.

The HVAC system 10 of the present invention further includes a vent/heater (or first) airflow path 20 (hereinafter "heater airflow path"), a separate defroster (or second) airflow path 22, and a separation channel 24. The separation channel 24 provides a means for independently controlling the temperature of the air and the volume of the in the defroster airflow path 22, as will be explained further below. Thus, the present invention has a vent/heater mode and a defroster mode that are controlled independently of each other.

Referring to FIG. 2, an air mixing door 26 is located near the entrance of the heater airflow path 20 between the evaporator 16 and the heater core 18. The air mixing door 26 can be rotated to different positions to control the amount of cold air C from the evaporator 16 that flows into the heater airflow path 20. The cold air C from the evaporator 16 enters a mixing chamber 28 where it is mixed with hot air H from the heater core 18 to thereby form mixed air M. Thus, the temperature of the air flowing through the heater airflow path 20 can be adjusted by adjusting rotation of the air mixing door 26.

The air continues to flow through the heating airflow path 20 where it eventually exits through a vent (or first) air outlet 30 and/or a heater (or second) air outlet 32. The volume of air exiting through the vent air outlet 30 and/or the heater air outlet 32 is controlled by the opening and closing of a vent (or first) damper door 34 and a heater (or second) damper door 36.

For example, if the vent damper door 34 is in a full closed (horizontal) position, as shown in FIG. 2, and the heater damper door 36 is in a full open position then the ratio of the volume of air exiting the heater air outlet 32 to the volume of air exiting the vent air outlet 30 is approximately 100:0. Conversely, if the vent damper door 34 is in a full open (near vertical) position and the heater damper door 36 is in a full closed position, then the ratio of the volume of air exiting the heater air outlet 32 to the volume of air exiting the vent air outlet 30 is approximately 0:100. It should be noted, however, that both the vent damper door 34 and the heater damper door 36 can be operated together and both be in partially open positions. Thus, the ratio of the volume of air exiting the vent air outlet 30 to the volume of air exiting the heater air outlet 32 may vary in a range of ratios from 100:0 to 0:100. Both the vent damper door 34 and the heater damper door 36 are operated by independent actuators or by one actuator with a linkage lever connected to each door (not shown).

Still referring to FIG. 2, a defroster hot air bypass door 38 (hereinafter "bypass door") is located above the heater core 18 near the entrance to the defroster airflow path 22. The bypass door 38 can be rotated, via a first actuator 40, to different positions to control the amount of hot air H that flows from the heater core 18 into the defroster airflow path 22 where the hot air H exits through a defroster (or third) air outlet 42. For example, if the bypass door 38 is in a full open position, then the temperature of the air exiting the defroster air outlet 42 will be at a maximum. If the bypass door 38 is in a full closed position then the temperature of the air exiting the defroster air outlet 42 will be at a minimum. Accordingly, the temperature of the air exiting the defroster air outlet 42 can be adjusted to any temperature between the maximum and the minimum by simply positioning the bypass door 38 between the full open and the full closed position. Thus, the temperature of the air exiting the defroster air outlet 42 is controlled or regulated by simply adjusting the bypass door 38. It should be noted, as explained above, that hot air H from the heater core 18 also flows into the mixing chamber 28 where it mixes with the cold air C from the evaporator 16. Thus, if the vent/heater mode is in an ON position, hot air H from the heater core 18 will flow into the mixing chamber 28 regardless of the position of the bypass door 38.

The volume of air exiting through a defroster air outlet 42 is controlled by the opening and closing of a defroster (or third) damper door 44. For example, if the defroster damper door 44 is in a full closed (horizontal) position, which indicates that the defroster mode is in an OFF position, then no air will exit the defroster air outlet 42. Conversely, if the defroster damper door 44 is in a full open (near vertical) position, then the volume of air exiting the defroster air outlet 42 is at a maximum. It should be noted, however, that the defroster damper door 44 can be in any position between the full closed or open positions. Thus, the volume of air exiting the defroster air outlet 42 can be adjusted, via a second actuator 46, by simply adjusting the defroster damper door 44. An advantage to the present invention is that the defroster damper door 44 operates independently of both the vent damper door 34 and the heater damper door 36.

As shown in FIGS. 2 and 3, the separation channel 24 is situated such that the airflow of the heater airflow path 20 flows through the separation channel 24 and the airflow of the defroster air path 22 flows on either side of the separation channel 24. Thus, the airflow through the heater airflow path 20 and the airflow through the defroster airflow path 22 do not cross or interfere with each other. Therefore, due to the presence of the separation channel 24, the temperature and the volume of the airflow through the defroster airflow path 22 can be controlled independently of the temperature and the volume of the airflow through the heater airflow path 20. In other words, the temperature of the air in the defroster air path 22 can be adjusted by adjusting the bypass door 38 without disrupting the temperature of the air in the heater air path 20. Similarly, because the defroster damper door 44 operates independently of the vent damper door 34 and the heater damper door 36, the volume of the airflow in the defroster airflow path 22 can be adjusted by adjusting the defroster damper door 44 without disrupting the volume of the airflow in the heater air path 20. Note that the damper doors 34, 36, 44, and the bypass door 38 are not shown in FIG. 3 for clarity.

FIGS. 4A and 4B show different types of doors that can be used in the present invention. Specifically, FIG. 4A illustrates a center shaft (or butterfly type) door 34, 36, 44 and FIG. 4B shows a one side shaft door 34A and 36A. It should be noted, however, that the type of door is not limited to the types shown in the figures. Thus, all the doors shown in the figures may be any type of door commonly known in the art.

Figure 5A:
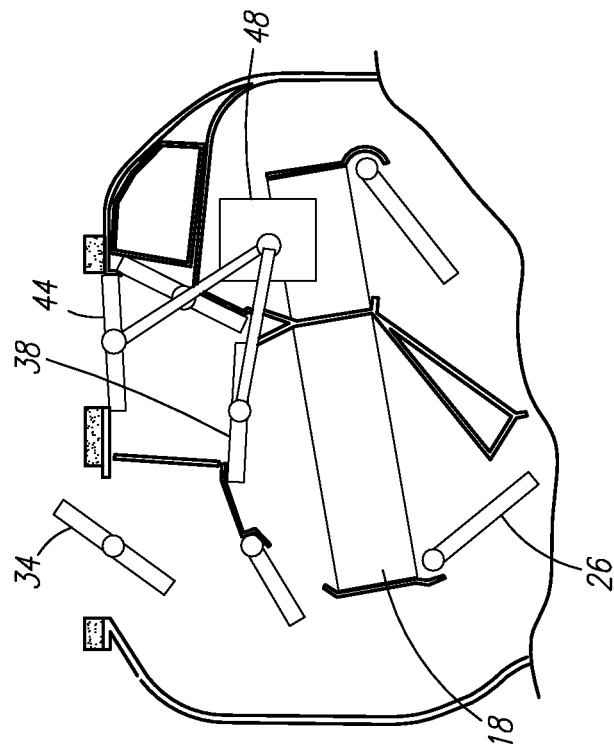
FIGS. 5A and 5B are schematic views of the HVAC system showing different actuator options.
Figure 5B:
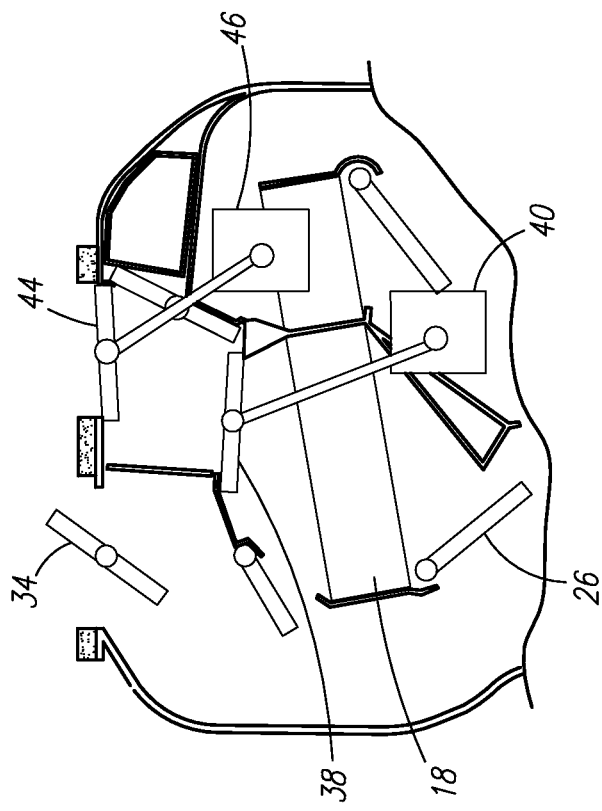

FIGS. 5A and 5B show different arrangement of actuators that can be used to operate the bypass door 38 and the defroster damper door 44. Specifically, FIG. 5A shows two separate actuators. A first actuator 40 to operate the bypass door 38 and a second actuator 46 to operate the defroster damper door 44. The first actuator 40 and the second actuator 46 operate independently of each other. On the other hand, FIG. 5B shows a single actuator 48 to operate both the bypass door 38 and the defroster damper door 44 simultaneously. It should be noted that the actuators shown in the figures may be any type of actuator commonly know in the art.

While specific embodiments of the invention have been described and illustrated, it is to be understood that these embodiments are provided by way of example only and that the invention is not to be construed as being limited but only by proper scope of the following claims.

What is claimed is:

1. An HVAC system for an automotive vehicle comprising:
   an evaporator for providing cold air;
   a heater core for providing hot air;
   a heater airflow path to direct an airflow through a heater air outlet;
   a heater damper door to control a volume of the airflow through the heater air outlet;
   a defroster airflow path to direct an airflow through a defroster air outlet;
   a defroster damper door to control a volume of the airflow through the defroster air outlet;
   a separation channel that is disposed downstream from the heater core, forms part of the heater airflow path by communicating airflow to the heater air outlet, and crosses the defroster airflow path, wherein the separation channel prevents the airflow of the heater airflow path from mixing with the airflow of the defroster airflow path at a position at which the separation channel is located;

a bypass door disposed downstream from the heater core and upstream from the defroster damper door at an entrance of the defroster airflow path, the bypass door controls a volume of hot air that flows from the heater core directly into the defroster airflow path so as to control a temperature of the airflow through the defroster air outlet without disrupting a temperature of the airflow through the heater core and in the heater airflow path; and a mixing chamber, wherein hot air from the heater core flows into the mixing chamber independent of a position of the bypass door, wherein the cold air from the evaporator and the hot air from the heater core form mixed air in the mixing chamber, and wherein the hot aft controlled by the bypass door flows directly from the heater core into the defroster airflow path and bypasses the mixing chamber so as to pass through into defroster airflow path without mixing with the cold aft from the evaporator, wherein the defroster damper door is configured to operate independently from the heater damper door.

2. The HVAC system of claim 1, further comprising an air mixing door disposed upstream from the heater core and near an entrance of the heater airflow path, wherein the air mixing door controls an amount of cold air that flows from the evaporator to the heater core.

3. The HVAC system of claim 1, further comprising a vent air outlet and a vent damper door to control a volume of the airflow through the vent air outlet, wherein operation of both the heater damper door and the vent damper door together control a ratio of airflow volume through the heater air outlet and the vent air outlet.

4. The HVAC system of claim 1, further comprising a first actuator configured to control the operation of the bypass door, and a second actuator configured to control the operation of the defroster damper door, wherein the first actuator is configured to operate independently of the second actuator.

5. The HVAC system of claim 1 further comprising an actuator to simultaneously control the operation of the bypass door and the operation of the defroster damper door.

6. The HVAC system of claim 1, wherein the heater damper door movable between a full open position, at which the heater air outlet is maximally opened, and a full closed position, at which the heater air outlet is fully closed so as to prevent airflow from passing through the heater air outlet, and the defroster damper door movable between a full open position, at which the defroster air outlet is maximally opened, and a full closed position, at which the defroster air outlet is fully closed so as to prevent airflow from passing through the defroster air outlet.

7. The HVAC system of claim 3, wherein
the heater damper door movable between a full open position, at which the heater air outlet is maximally opened, and a full closed position, at which the heater air outlet is fully closed so as to prevent airflow from passing through the heater air outlet,
the defroster damper door movable between a full open position, at which the defroster air outlet is maximally opened, and a full closed position, at which the defroster air outlet is fully closed so as to prevent airflow from passing through the defroster air outlet, and
the vent damper door movable between a full open position, at which the vent air out et is maximally opened, and a full closed position, at which the vent air outlet is fully closed so as to prevent airflow from passing through the vent air outlet.

8. The HVAC system of claim 1, wherein the bypass door is movable relative to the entrance to the defroster airflow path between a full open position, at which a maximum volume of hot air flows directly into the defroster airflow path and the temperature of the airflow through the defroster air outlet is a maximum temperature, and a full closed position, at which a minimum volume of hot air flows directly into the defroster airflow path and the temperature of the airflow through the defroster air outlet is a minimum temperature.

\* \* \* \* \*

UNITED STATES PATENT AND TRADEMARK OFFICE
CERTIFICATE OF CORRECTION

PATENT NO.          : 8,939,822 B2
APPLICATION NO.     : 12/372090
DATED               : January 27, 2015
INVENTOR(S)         : Shinji Kakizaki and Junichi Kanemaru It is certified that error appears in the above-identified patent and that said Letters Patent is hereby corrected as shown below:

In the Claims,

Col. 5, Line 17 in Claim 1, please insert the word --air-- instead of the word "aft";

Col. 5, Line 21 in Claim 1, please insert the word --air-- instead of the word "aft";

Col. 6, Line 27 in Claim 7, please insert the word --outlet-- instead of the word "out et".

Signed and Sealed this
Twelfth Day of May, 2015

Michelle K. Lee
*Director of the United States Patent and Trademark Office*